United States Patent [19]

Kato et al.

[11] 4,310,640

[45] Jan. 12, 1982

[54] CURABLE COMPOSITION

[75] Inventors: Yasushi Kato; Hisao Furukawa; Shoichi Matsumura, all of Kobe; Saori Nakatsuka, Ashiya, all of Japan

[73] Assignee: Kanegafuchi Kogaku Kogyo Kabushiki Kaisha, Osaka, Japan

[21] Appl. No.: 150,638

[22] Filed: May 16, 1980

[51] Int. Cl.$^3$ .................. C08C 19/00; C08F 8/00; C08F 8/42
[52] U.S. Cl. .................. 525/100; 525/102; 525/103; 525/106; 525/328; 525/329; 525/342; 528/38; 528/272; 528/297; 556/410; 556/426; 556/428; 556/438; 556/440; 556/463; 556/482; 556/484; 556/486
[58] Field of Search ............... 525/106, 100, 102, 103, 525/328, 329, 342; 528/38, 272, 297; 556/410, 426, 428, 438, 440, 486, 484, 482, 463

[56] References Cited

U.S. PATENT DOCUMENTS

| 3,857,825 | 12/1974 | Streck et al. | 525/106 |
| 3,870,766 | 3/1975 | Chadha | 525/106 |
| 4,161,572 | 7/1979 | Yonezawa et al. | 525/100 |
| 4,191,713 | 3/1980 | Yonezawa et al. | 525/100 |
| 4,191,714 | 3/1980 | Yonezawa et al. | 525/100 |
| 4,211,729 | 7/1980 | Marquandt et al. | 525/106 |

FOREIGN PATENT DOCUMENTS

| 4534707 | 9/1966 | Japan | 525/106 |
| 1048915 | 11/1966 | United Kingdom | 525/106 |

Primary Examiner—William F. Hamrock
Attorney, Agent, or Firm—Moonray Kojima

[57] ABSTRACT

A composition comprising (a) an organic compound having at least one hydrolyzable silyl group and (b) an organic amine and/or an alkali metal hydroxide. The composition is curable upon exposure to moisture, and has superior properties, such as hardness, toughness and stain resistance, when used for example as a coating. The composition can be utilized as a coating material.

12 Claims, No Drawings

CURABLE COMPOSITION

BACKGROUND OF THE INVENTION

This invention relates to compositions containing silyl group which can be readily cured upon exposure to moisture in the ambient atmosphere and at room temperature or higher.

Compounds containing such reactive silyl groups have been used priorly for paints, coating materials, coupling agents of silane, rubber adhesives, and sealants, because of their high reactivity. More particularly, compounds containing condensation curing silyl groups having hydroxyl group, alcoxyl group or the like as the reactive component, have been used for various purposes. Even though compounds of the condensation type can advance their reaction without having any catalyst therein, because of moisture in the ambient atmosphere, curing catalysts have been generally used to improve performance.

Organotin compounds, such as dibutyltin dilaurate, dibutyl tin dimaleate or the like are well known as curing catalyst. However when these are used, the curing speed of compounds of the condensation type is still low. For example, the curing is barely promoted by heating at 60° to 80° C., and the setting is even slow at 120° to 300° C.

Consequently, it is highly desirable to find a catalyzer which can promote curing of compounds of the condensation type at a faster speed than the conventional organotin catalyzer. Conventional catalyzers have been inadequate for a number of uses, such as for use in composition used for repair of automobiles or for painting or bridges, wherein rapid speed of drying and simple painting equipment are required.

SUMMARY OF THE INVENTION

Accordingly, it is an object of the invention to eliminate and improve upon the aforementioned deficiencies of the prior art.

A further object of the invention is to employe a more efficient catalyzer in a curable composition, which composition is curable upon exposure to moisture in the ambient air, to enable more rapid curing and the production of a composition which has such properties as hardness, toughness and good stain resistance.

The present inventors have discovered that faster curing and a higher quality composition containing silyl group having hydrolyzable group, could be obtained by adding thereto an organic amine and/or an alkali metal hydroxide. Moreover, the inventors discovered that further adding a reactive silicon compound would further improve the performance.

A feature of the invention is the use of an organic amine and/or an alkali metal hydroxide in a composition containing a silyl group having a hydrolyzable group, wherein the curing speed is unexpectedly and substantially improved, and the properties of hardness, toughness and stain resistance are substantially and unexpectedly improved.

A further feature is the use of a reactive silicon compound in addition to the use of the organic amine and/or alkali metal hydroxide in the composition.

The foregoing features, advantages and objects are further illustrated in the following detailed description.

DETAILED DESCRIPTION OF PREFERRED EMBODIMENTS

The compounds which contain silyl groups and which are used in the present invention may be obtained by addition reaction of silicon hydride compounds with compounds having carbon-carbon double bonds at their ends or in their side branches, and using, for example a platinum catalyst. These compounds having carbon-carbon double bonds include (1) polyester, (2) vinyl polymer, (3) dailly phthalate, (4) copolymer of diallyl phthalate and the like. They may be employed as coating materials, rubber adhesives, sealants and the like. These compounds have the preferable molecular weights of within the range of 200 to 30,000, with the individual specific compound having more specific ranges of preferred molecular weights as set forth hereinafter.

Polyesters having carbon-carbon double bonds of their ends or in their side chains, may be obtained by reacting, for example, polyester having hydroxylic groups at its ends (e.g. a polyester sold under the trademark "DESMOPHEN" and manufactured by Nippon Polyurethane Co., Ltd) with acrylchloride on a base such as sodium hydride. Another method involves condensation reaction of dibasic acids with diols which partially comprises allyl glycidyl ether. Another method employes interchange reaction of polyesters having hydroxylic groups at their ends with diallyl esters such as diallyl phthalate on an ester interchange catalyst, such as toluene sulfonic acid. A further method employes condensation reaction of dibasic acids with diols under an excessively acidic condition and then esterification of the condensation product using allyl alcohol during condensation reaction or after condensation reaction. Furthermore, polyesters having olefinic groups of allyl type in their molecule may be obtained by reacting acid anhydrides with epoxy compounds and alcohols of allyl type to regulate the molecular weight of polyesters, by using alcohols and simultaneously introducing allyl groups therein under the existence of tertiary or quaternary ammonium salts. A further method involves using allyl glycydyl ether as one component of epoxy compounds. Polyesters having acryloyl groups or methacryloyl groups at their ends may be obtained by a condensation reaction of diols with dibasic acids and acrylic acid (or methacrylic acid) according to known method. The polyester is preferably of a molecular weight of from 300 to 8,000.

Vinyl polymers having carbon-carbon double bonds can be obtained by radical copolymerization of allyl acrylate, allyl methacrylate or the like with vinyl compounds such as styrene, alpha methylstyrene, acrylic acid and its esters, methacrylic acid and its esters, acrylic amide, vinyl acetate, ethylene, maleic anhydride and the like. The vinyl polymers used in the invention are preferably of a molecular weight of from 300 to 20,000.

The diallyl phthalate compounds having carbon-carbon double bonds include monomers or prepolymers of diallyl phthalate. Commercially available compounds may be used. The diallyl phthalate compounds are preferably of a molecular weight of up to 20,000.

Copolymers of diallyl phthalate having carbon-carbon double bonds and acrylic ester or methacrylic ester, can be polymerized by using initiators, such as azo compounds, peroxides and the like, and the number of double bonds can be regulated by changing the amount of diallyl phthalate added as a component of copolymerization. The copolymer of diallyl phthalate used in the invention is preferably of a molecular weight of from 300 to 20,000. The diallyl phthalate content in the copolymer is preferably from 5 to 100 mol percent.

The reactive silicon compound which may also be added to the composition, includes silane halogenides, such as trichlorosilane, methyldichlorsilane, dimethylchlorsilane and pheyldichlorsilane; alcoxysilanes, such as trimethyoxysilane, triethoxysilane, methyldimethoxysilane, methyldiethoxysilane and phenyldimethoxysilane; acyloxysilanes, such as methyldiacetoxysilane and phenyldiacetoxysilane; ketoxymatesilanes, such as bis(-dimethylketoxymate) methylsilane and bis(cyclohexylketoxymate) methylsilane, and the like.

In the case of silane halogenides, they may be displaced by other hydrolyzable groups after their hydrosilation reaction. Vinyl polymers containing silyl groups can be obtained by copolymerization of silyl compounds containing vinyl groups, such as vinyltrimethoxysilane, alpha-methacryloxy-propyl trimethoxysilane and alpha-methyacryloxpropyl methyldimethoxysilane and vinyl compounds such as styrene, alpha-methylstyrene, acrylic acid and its esters, methacrylic acid and its esters, acrylic amides, vinyl acetate and ethylene. Maleic anydride may also be used as the reactive silicon compound. Silicon containing polymers can be obtained by reaction of organic polymers containing epoxy groups, such as copolymers of vinyl compounds and glycidyl methacrylate or epoxy polymers with γ-aminopropyltrimethoxysilane. Such polymers may also be obtained by reaction of organic polymers, such as polyesters containing carboxyl groups or vinyl polymers, with γ-glycidoxypropyltrimethoxysilane.

The silyl group containing compounds obtained in the foregoing manner have at least one hydrolyzable group connected to silicon atoms and can be cured upon exposure to the moisture in the ambient atmosphere. While various kinds of silyl groups may be obtained by different methods of manufacturing, they are described by the following general formula:

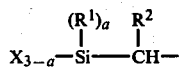

wherein $R^1$ and $R^2$ designate hydrogen or monovalent hydrocarbon group selected from the group consisting of alkyl groups, aryl groups and alalkyl groups, wherein there are 1 to 10 carbon atoms; "X" is a member selected from the group consisting of halogen of alcoxyl groups, hydroxyl groups, aminoxyl groups, phenoxyl groups, thioalcoxyl groups and amino groups; and "a" designates an integer 0, 1 or 2.

The following organic amines may be used in the inventive composition: aliphatic diamines, such as ethylene diamine and hexane diamine; aliphatic polyamines, such as diethylene triamine, triethylene tetramine and tetraethylene pentamine; aliphatic cyclic amines, such as piperazine and piperidine; aromatic amines such methaphenylene diamine; ethanol amines; triethylamine and the like. Also various kinds of denatured amines, polyamide resins or the like which are used as hardeners for epoxy resins may be used. While such organic amines may be used alone to increase, to a sufficient degree, the setting speed of the composite and to improve the properties thereof, the inventors have discovered that their use in combination with reactive silicon compounds, in particular those which are known as silane coupling agents, leads to further unexpected and substantial improvement in the characteristics and adherence of the inventive composition, such as when employed as a film.

Commercially available silane coupling agents may be used. These agents are described by the following general formula:

wherein $R^3$ designates monovalent hydrocarbon group selected from the group consisting of alkyl groups, aryl groups and alalkyl groups wherein there are 1 to 10 carbon atoms; "Y" designates a group selected from the group consisting of halogens, alcoxyl groups and acyloxyl groups; "Z" designates monovalent hydrocarbon groups containing vinyl groups, amino groups, epoxy groups and mercapto groups; and "b" designates an integer of 0, 1 or 2.

These silane coupling agents may be, for example, γ-aminopropyltriethoxysilane, N-β-(aminoethyl)-γ-aminopropyltrimethoxysilane, γ-glycidoxypropyltrimethoxylsilane, β-(3,4-epoxycyclohexyl) ethyltrimethoxysilane, γ-mercaptopropyltrimethoxysilane, vinyltriethoxysilane, vinyl-tris-(2-methoxyethoxy)silane, vinyltrichlorsilane, methylvinyldichlorsilane, γ-methacryloxypropyltrimethoxysilane and the like.

Sodium hydroxide and potassium hydroxide are preferably used as hydroxides of alkali metals from the viewpoint of their general characteristics and solubility in alcohols.

As reactive silicon compounds which can be used in the invention, the following having functioning groups, such as —OR group, —OH group or the like connected to silicon atoms and can be subjected to condensation reaction themselves, preferably reacting with compounds containing silyl groups, for example the silane coupling agents or their reaction mixtures, methyl silicate, ethyl silicate, or their wholely or partially hydrolyzed products. The above described silane coupling agents can be used also herein. The reaction mixture of silane coupling agents include, for example, reaction products obtained by heating a mixture of silane coupling agents containing amino groups and silane coupling agents containing epoxy groups, at 60° to 100° C. Ethyl silicate 40 HAS-1 (manufactured by Japan Colcoat Co.) or the like can be used as a partially hydrolyzed product of ethyl silicate.

The amount of each component used in the inventive composite is not limited but is optionally determined in accordance with the use to which the composite is employed. In general applications when a composite is used as coating agent, such as paint, organic amines of 0.1 to 30 weight parts, pereferably 0.1 to 5 weight parts, and furthermore silane coupling agents of 0 to 10 weight parts, preferably 0.1 to 5 weight parts, as desired may be added to compounds containing silyl groups of 100 weight parts.

Also, hydroxides of alkali metals of 0.01 to 10 weight parts, preferably 0.1 to 5 weight parts, and furthermore silane coupling agents or their reaction products of 0.1 to 10 weight parts, preferably 0.1 to 5 weight parts or ethyl silicate or its partially hydrolyzed products of 0 to 100 weight parts, preferably 0.1 to 50 weight parts, may be added to compounds containing silyl groups, of 100 weight parts. The addition of a silane coupling agent or a reaction mixture of the agents, can remarkably improve the setting speed and improve the impact strength of the resulting inventive composite. Furthermore, the addition of ethyl silicate or its partially hydrolyzed products can remarkably improve stain resistance, adherence, impact resistance, solvent resistance and boiling water resistance, of the resulting inventive composite.

The inventive composite may contain various other components, such as diluents, solvents and additives. For example if paint of high solid content is desired, that is to say, it is required to decrease the amount of solvent, ethyl silicate, organopolysiloxane or the like of preferably 50 weight parts or less, may be added to compounds containing the silyl groups of 100 weight parts.

The inventive composite can be set even at room temperature by use of the organic amine and/or hydroxides of alkali metals. Thus, advantageously, such composite is useful for the repair of cars, paint for the bumper of cars, precoating of metals, heavy duty protection against corrosion of bridges and the like, paint for building materials, etc. Furthermore, advantageously, the inventive composite is useful as a coating material and as adhesives for various types of basic materials, such as iron sheet coated with zinc, aluminum, glass, plastics and rubber. Pigments, fillers or the like may be also added to the invention composite when desired. According to the circumstances, the composite may be mixed with known lacquer paint, acryl lacquer paint, thermosetting acryl paint, alkyd paint, epoxy paint and the like in suitable proportions.

The invention will be further illustrated by the following actual examples, which examples, are not to be construed in any manner which would limit the invention.

EXAMPLE 1

Phthalic anhydride of 148 g, propylene oxide of 46.4 g, allyl glycidylether of 22.8 g, allyl alcohol of 11.6 g and dimethylbenzylamine of 0.5 g, were placed in a metal autoclave having a capacity of 1 liter, and heated at 100° C. After 3 hours, from start of the reaction, propylene oxide of 46 g was added and then the reaction continued for one hour. Then, an excess amount of propylene oxide was removed to obtain polyester having molecular weight of 1,200. The mixture obtained by adding acetic anhydride of 9.5 g into the obtained polyester of 100 g, was heated at 120° C. for 2 hours and then an excess of amount of acetic anhydride was removed from the reaction mixture under vacuum to treat hydroxyl groups in polyester. After reacting polyester of which hydroxyl groups were treated of 22.2 g with chloroplatinic acid of 0.0035 g and methyl dichlorsilane of 8.65 g at 80° C. for 3 hours, an excess amount of methyl dichlorsilane was removed under vacuum. Then, methanol of 20 ml and methyl orthoformate of 20 ml were added and the mixture was stirred at room temperature for one hour. Then, substances having low boiling point were removed from the reaction mixture under vacuum to obtain polyester containing silyl groups.

EXAMPLE 2

A mixture comprising styrene of 30 g, allyl methacylate of 16 g, methyl methacrylate of 20 g, n-butyl methacrylate of 19 g, n-butyl acrylate of 14 g, acrylic acid of 1 g and a solution of azo-bis-isobutylonitrile of 2 g in n-dodecyl mercaptane of 2 g was added into toluene of 100 g at 90° C. drop by drop. After 10 hours, vinyl polymer containing unsaturated groups of allyl type and having molecular weight of 8,000 was obtained. The vinyl polymer which was obtained in this manner showed an absorption owing to carbon-carbon double bond at 1,648 cm$^{-1}$ in its infrared absorption spectrum.

A solution of methyl dimethoxysilane of 1.5 g and chloroplatinic acid of 0.0005 g in isopropanol was added to the solution of vinyl copolymer containing unsaturated groups of allyl type of 20 g. The mixture was heated at 90° C. for 6 hours under sealed condition. The reaction mixture did not show an absorption at 1,648 cm$^{-1}$ in its infrared absorption spectrum. Vinyl polymer containing silyl groups was obtained.

EXAMPLE 3

A copolymer of diallyl phthalate type containing silyl groups was obtained by the same reaction as shown in Example 2, except that diallyl phthalate of 31 g was used instead of allyl methacrylate of 16 g.

EXAMPLE 4

A mixture comprising styrene of 30 g, γ-methacryloxypropyltrimethoxysilane of 27 g, methyl methacrylate of 20 g, n-butyl methacrylate of 19 g, n-butyl acrylate of 14 g, acrylic acid of 1 g and a solution of azo-bis-isobutylonitrile of 2 g in n-dodecyl mercaptane of 2 g, was added into toluene of 100 g at 100° C. drop by drop. After 10 hours, vinyl polymer containing silyl groups was obtained having a molecular weight of 9,000.

EXAMPLE 5

A prepolymer of diallyl phthalate (DapL made by Osaka Soda Co., Ltd; having iodine value of about 80) of 100 g, chloroplatinic acid of 0.00001 g and hydroquinone of 1 g, were dissolved in toluene of 100 g. Methyl diethoxysilane of 35 ml was added into solution. The mixture was heated at 90° C. for 3 hours to obtain a prepolymer of diallyl phthalate containing silyl groups.

Three types of test pieces, those being A, B and C were prepared using the inventive compositions as shown below.

Test pieces A. To 100 parts by weight (as a solid content) of the resulting composition containing silyl group, as prepared in Examples 1-5, 100 parts by weight of titanium oxide were added and mixed to form a enamelized state. Subsequently, organic amines alone or combined with silane coupling agent were admixed therewith. The resulting composition was coated on a soft iron place in such a proportion as shown in Table 1, and then heated at 60° C. for 30 minutes.

Test pieces B. The same procedure as for test pieces A were used, except that alkali metal hydroxides were used in place of organic amines.

Test pieces C. A compound containing silyl group of 100 parts by weight as solid content, as obtained in Example 2, were admixed with an organic amine and with an alkali metal hydroxide as shown in Table 1, and then the resulting mixture was treated in the same manner as in preparing Test pieces A.

The test pieces were tested for pencil hardness, DuPont impact strength, spot test and stain resistance. The pencil hardness test was carried in accordance with the procedures of Japanese Industrial Standard JIS K5400. The spot test was carried out by dropping lacquer thinner and toluene of one or two drops on each of the test pieces and observing them after evaporating of the solvent. "O" was designated to test pieces which did not show anything wrong. "X" was designated to test pieces which showed dissolution of swelling (swelling or peeling). The stain resistance test was carried out by applying a coat of rouge and oily magic ink (black, red) (made by Teranishi Kagaku Co, Ltd) and observing the surfaces of the test pieces after removing the rouge and oily magic ink by using methanol. "O" was designated test pieces from which rouge and oily marking ink were completely removed. "Δ" was given to test pieces from which rouge and oily marking ink were partially removed. "X" was designated for test pieces on which rouge and marking ink were almost all remaining.

As a comparison, similar tests were performed on samples obtained using conventional dibutyl tin dilaurate as a catalyst. The results are shown in Table 1.

In Table 1, 1-A-1 means that the test piece A comprises the composition containing silyl group obtained in Example 1, and was employed for tests as run number 1.

As seen from the below Table 1, using the organic amines and/or alkali metal hydroxides, produced unexpectedly good results as compated with the use of prior art organo tin compounds as a catalyst.

The foregoing and the below Table illustrate the principles of the invention. Numerous other variations and modifications thereof would be apparent to the worker skilled in the art. All such variations and modifications are to be considered to be within the spirit and scope of the invention.

TABLE 1

| Example | Curing Catalyzer Organic amines or alkali metal hydroxides(parts) | Curing Catalyzer Reactive silicon compounds (parts) | Spot Test Pencil hardness | Spot Test Lacquer thinner | Spot Test Toluene | DuPont impact strength $\frac{1}{4}''$ 1 kg (cm) | Stain Resistance Rouge | Stain Resistance Black oily marking ink | Stain Resistance Red oily marking ink |
|---|---|---|---|---|---|---|---|---|---|
| 1-A-1 | Triethylene tetramine(2) |  | H | O | X | 50 | O | O | Δ |
| 1-A-2 | Triethylene tetramine(2) | A-187*(1) | H | O | O | 50 | O | O | O |
| 1-B-1 | NaOH(0.5) | A-187(1) | H | O | O | 50 | O | O | Δ |
| 2-A-1 | Q-631*(2) |  | 2H | O | X | 30 | O | O | Δ |
| 2-A-2 | Q-631(2) | A-1120(1) | 2H | O | O | 50 | O | O | O |
| 2-B-1 | KOH(0.5) | A-187(0.5) Ethyl silicate(5) | 2H | O | O | 50 | O | O | O |
| 2-B-2 | KOH(1) |  | H | O | O | 30 | Δ | O | Δ |
| Comparative Ex. 2 | Dibutyl tin dilaurate(2) |  | HB | X | X | 10 | X | X | X |
| 3-A-1 | Piperidine(3) |  | 2H | O | X | 30 | O | O | Δ |
| 3-A-2 | Piperidine(3) | α-aminopropyltriethoxysilane (2) | 2H | O | O | 50 | O | O | O |
| 3-B-1 | NaOH(1) | Ethyl silicate(5) | 2H | O | O | 50 | O | O | Δ |
| 3-B-2 | NaOH(0.5) | A-1120(1) | 2H | O | O | 50 | O | O | Δ |
| 4-A-1 | Monoethanol amine(2) |  | 2H | O | O | 30 | O | O | Δ |
| 4-A-2 | Monoethanol amine(2) | A-189(1) | 2H | O | O | 50 | O | O | O |
| 4-B-1 | NaOH(1) | [A-187* A-1120](0.5) | 2H | O | O | 50 | O | O | O |
| 4-B-2 | NaOH(1) |  | H | O | O | 30 | Δ | O | Δ |
| Comparative ex. 4 | Dibutyl dilaurate(4) |  | F | X | X | 10 | Δ | Δ | Δ |
| 5-A-1 | Triethyl amine(1) | Vinyltriethoxysilane(1) | 2H | O | O | 30 | O | O | Δ |
| 5-B-1 | KOH(0.5) | A-189(1) | 2H | O | O | 30 | O | O | Δ |
| 2-C-1 | Tetraethylene pentamine(1) | KOH(1) | 2H | O | O | 40 | O | O | Δ |

NOTES:
A-187, made by UCC, α-glycidoxypropyltrimethoxysilane.
Q-631, made by Mitsui Petrochemical Epoxy CO, Ltd, curing agent for epoxy resin.
A-1120, made by UCC, N-β-(aminoethyl)-α-aminopropyltrimethoxysilane.
A-189, made by UCC, α-mercaptopropyltrimethoxysilane.
A-187 A-1120  The product obtained by reacting A-187 with A-1120 at 90° C. for 3 hours.
UCC-Union Carbide and Carbon Co.

What is claimed is:

1. A curable composition comprising an organic polymer having at least one hydrolyzable silyl group and; and a catalyzer selected from the group consisting of an organic amine selected from the group consisting of aliphatic diamines, aliphatic polyamines, aliphatic cyclic amines, aromatic amines, ethanol amines and triethylamines alkali metal hydroxides and mixtures; wherein said silyl group is shown by the formula:

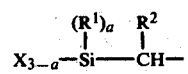

wherein $R^1$, $R^2$ is hydrogen or monovalent, hydrocarbon group, X is a hydrolyzable group selected from the group consisting of halogen alcoxyl group, hydroxyl group, aminoxyl group, phenoxyl group, thioalcoxyl group and amino group, and "a" is an integer 0, 1 or 2 wherein said polyester having said silyl groups at their ends or in their side chains and having a molecular weight of from 300 to 8,000 and said vinyl polymers being copolymers of allyl acrylate or allyl methacrylate with vinyl monomers and having a molecular weight of 300 to 20,000.

2. The composition of claim 1, wherein said vinyl polymer contains acrylic ester and/or methacrylic ester.

3. The composition of claim 1, wherein said catalyst is a hydroxide of alkali metal.

4. The composition of claim 1, wherein said catalyst is a mixture of an organic amine and a hydroxide of an alkali metal.

5. The composition of claim 1, wherein said composition further comprises a reactive silicon compound.

6. The composition of claim 5, wherein said reactive silicon compound comprises at least one member of silane coupling agent.

7. The composition of claim 5, wherein said reactive silicon compound is selected from the group consisting of methyl silicate/ethyl silicate, and hydrolyzed products of each of the foregoing.

8. The composition of claim 6, wherein said silane coupling agent comprises as its functional group an amino group.

9. The composition of claim 6, wherein said silane coupling agent comprises as its functional group an epoxy group.

10. The composition of claim 6, wherein said silane coupling agent comprises as its functional group a mercapto group.

11. The composition of claim 6, wherein said silane coupling agent comprises as its functional group a vinyl group.

12. The composition of claim 1, wherein said alkali metal hydroxides is selected from the group consisting of sodium hydroxides and potassium hydroxides.

* * * * *